July 21, 1959  S. B. ROBISON ET AL  2,895,850
COATING FIBERS WITH MODIFIED BUTYL RUBBER
Filed Sept. 22, 1954
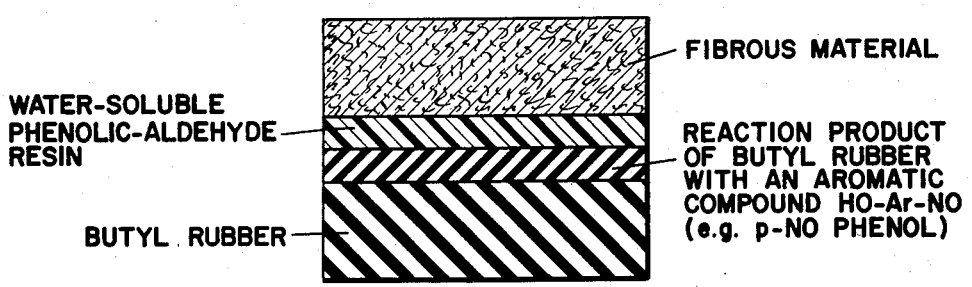
Samuel B. Robison
Francis P. Baldwin   Inventors
By W. H. Rogers   Attorney United States Patent Office — 2,895,850 — Patented July 21, 1959

2,895,850
COATING FIBERS WITH MODIFIED BUTYL RUBBER

Samuel B. Robison, Roselle, and Francis P. Baldwin, Colonia, N.J., assignors to Esso Research and Engineering Company, a corporation of Delaware Application September 22, 1954, Serial No. 457,794

16 Claims. (Cl. 117—76)

This invention relates to a novel method for coating natural and synthetic fibrous articles with modified Butyl rubber, and to the resulting products. The invention is typified by the coating of an automobile tire cord first with an aqueous solution of a resinous phenolic-aldehyde condensation product, preferably resorcinol-formaldehyde, and then coating it with a cement comprising a volatile solvent solution of Butyl rubber which has been reacted with a small amount of a nitrosohydroxy aromatic compound, preferably p-nitrosophenol, this cement preferably also containing a rubber pigment or filler such as carbon black, and the resulting dried, coated cord is found to have much greater adhesion to Butyl rubber layers used in constructing tires for autos, airplanes, etc.

In the construction of many rubber articles such as tires, belting, etc., a fabric made of a natural fiber such as cotton or a synthetic fiber such as rayon or nylon is included in the structure to provide rigidity and strength. The performance of the structures is dependent upon the bond present between the rubber and the fabric. In the construction of automobile tires, latex dips have been developed using natural rubber latex or any of several high unsaturation synthetic rubber latices which provide satisfactory adhesion not only to cotton tire cord which had been conventionally used in the past, but also to the more recently developed rayon cord and nylon cord, which have greater strength and smoother cord surfaces.

On the other hand, Butyl rubber which is a low unsaturation rubbery copolymer of an isoolefin such as isobutylene with a minor amount of a diolefin such as isoprene, does not normally have good adhesion to such fibers, particularly the synthetic fibers such as rayon and nylon.

The present invention solves this difficulty and provides a strong bond between Butyl rubber and such fibers, by reason of the coating technique as will be now described.

The fabric to be coated such as tire cord is first dipped in an aqueous solution of a phenolic-aldehyde resin, preferably resorcinol and formaldehyde. The proportions should be about 0.2 to 6 moles of formaldehyde per mole of resorcinol and the concentration should be about 1 to 10, preferably about 2 to 5 wt. percent resin solids in the water. A small amount of catalyst, preferably an alkaline condensation catalyst such as sodium hydroxide or carbonate should also be added. This catalyst may be used in a concentration of about 0.1 to 5.0, preferably 0.5 to 2.0 parts by weight per 100 parts of resorcinol. The resin solution may be prepared in any desired manner, but preferably is made by dissolving the resorcinol in the water, then adding the formaldehyde (commonly available as a 35–40% aqueous solution) and finally adding the caustic catalyst, preferably as 0.5 to 1.0% solution in water. The resin is then partially formed by reacting it at about 70–75° C. for 2 hours or so, and cooled to room temperature.

The tire cord, such as rayon or nylon cord, is then dipped into this aqueous solution preferably without distorting the original shape or twist of the cord, and then the resin-coated cord is dried by any desired manner, such as in a circulating air oven for 1 to 10 minutes at 200–300° F., e.g. 5 minutes at 250° F., or for a longer time at lower temperature, e.g. room temperature.

The resulting resin-coated cord is then dipped into a modified Butyl rubber cement made as follows: The modified Butyl rubber is made by reacting a Butyl rubber with a small amount such as 0.1 to 5.0%, preferably 0.5 to 3.0% of a nitrosohydroxy aromatic compound, preferably having the general formula HO—Ar—NO, in which Ar is an aromatic hydrocarbon nucleus, or a corresponding salt thereof, a preferred compound being p-nitrosophenol or the sodium salt thereof, as described more fully in our copending application, Serial No. 445,466, filed July 23, 1954, now abandoned of which the present application is a continuation-in-part.

These reagents are preferably nitrosophenolic type compounds having the empirical formula HO—Ar—NO, in which Ar represents an aromatic ring, which may be a benzene or naphthalene ring, etc., or lower alkyl homologs thereof containing 1 or more methyl, ethyl, etc. groups. Specific examples of such materials include the preferred compound paranitrosophenol, as well as paranitroso derivatives of other phenolic compounds, e.g. cresol, xylenol, isopropyl phenol, ethyl phenol, etc. and 1,4-nitrosonaphthol, or other compounds such as those coming under the following graphical empirical formulae:

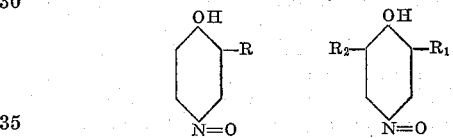

where R, $R_1$ and $R_2$ may be H, alkyl or aryl. Also, o- and m-compounds may be used, e.g. o-nitroso cresol (nitrosated o-cresol), nitrosated o-hydroxy diphenyl, etc. Esters of any of these various compounds may be used, such as the benzoate ester of p-nitrosophenol. Mixtures thereof may also be used. The Butyl rubber may be any synthetic rubbery copolymer as made according to U.S. Patent 2,356,128, for instance, a vulcanizable low unsaturation rubbery copolymer of an isoolefin of 4 to 6 carbon atoms such as isobutylene or methyl-2-butene-1, etc., with a minor proportion of a conjugated multi-olefin of 4 to 14 carbon atoms, preferably a conjugated aliphatic diolefin of 4 to 6 carbon atoms such as isoprene, butadiene, dimethylbutadiene, piperylene, 2-methylpentadiene, etc. These copolymers should have a Staudinger molecular weight above 20,000, preferably about 30,000 to 50,000, and an iodine number of about 0.5 to 50, preferably about 1 to 20. Such products are available commercially under the designation GR–I, and are manufactured, for instance, by copolymerizing about 97% by weight of isobutylene and 3% by weight of isoprene in the presence of about 1 to 20, preferably 2 to 5 volumes of an inert diluent such as methyl chloride, or heptane, etc., at —100° C. using as catalyst a solution of aluminum chloride or other Friedel-Crafts catalyst in a suitable solvent such as methyl chloride.

The Butyl rubber may be mixed with the nitrosophenolic compound, at any desired temperature, but in order to effect the desired reaction the mixture must be maintained at a temperature in the range of about 200–350° F., inversely for about 20 minutes to 1 minute, for example, by heating and mixing the composition at 260 to 280° F. for 10 to 15 minutes or heating at slightly higher temperatures such as 300–310° F. for 5–10 minutes or so. This reaction is preferably carried out before addition of any pigments, fillers, or curing agents, although some benefits of the invention may be derived even by adding the nitrosophenol to the Butyl rubber compounding mixture after the pigments and curing agents have all been added.

It is believed that some of the benefits of the invention are derived from a physical and/or chemical reaction of the nitrosophenol-reacted Butyl rubber with the pigment or filler, which may be a carbon black such as channel black, furnace black, etc., or inorganic fillers such silicas, aluminas, clays, etc. These fillers or pigments should be used in a proportion of about 10 to 75, preferably about 30 to 50 parts by weight per 100 parts of Butyl rubber. The usual other rubber compounding and curing agents may also be added such as 0.1 to 2.0 parts of stearic acid, 1 to 10, preferably 2 to 5 parts of zinc oxide, 1 to 2 or 3 parts of sulfur, and 1 to 2 parts of one or more vulcanization accelerators, particularly the more active or ultra accelerator types such as tellurium diethyl dithiocarbamate. Alternate curatives such as Tuads, Altax, etc. may be used. However, as later in the data, good adhesion can be obtained even without any curatives. 5 to 20 or 30 parts of plasticizer such as mineral oil may also be used, if desired.

The preferred procedure is to add the nitrosophenol to the Butyl rubber on a cool mill, then heating to the desired reaction temperature, such as at 275° F. for 15 minutes or so, then cooling to about 75 to 125° F. and adding the stearic acid and carbon black or other pigment or filler, then hot milling at about 225 to 350° F. inversely for about 15 to 3 minutes, for instance at 280° F. for five minutes, to effect the desired bonding of the carbon black with the Butyl rubber-nitroso reaction product. The mill is then preferably cooled to about 75 to 125° F. and the curing agents added, after which it is then ready, with or without further cooling, for preparation of the modified Butyl rubber cement by dissolving it in a concentration of about 8 to 20% by weight in a suitable volatile solvent, preferably an aliphatic hydrocarbon solvent of about 6 to 10, preferably 7 to 8 carbon atoms, such as heptane. Benzene and toluene may also be used. This cement may conveniently be prepared by dissolving the modified Butyl rubber composition on a mixed weight and volume basis, by using proportions corresponding to about 10 to 25, preferably 15 to 20 grams of the compounded modified Butyl rubber in 155 cc. of heptane. If desired, a small amount, such as 1 to 20 volume percent, preferably about 5 to 10 volume percent of an alcohol such as isopropyl alcohol or ethyl alcohol or other volatile viscosity-reducer may be added to the cement, to facilitate application of a larger amount of solids in a single dip.

The auto tire cord which has already been coated with the aqueous resin solution and dried, is now dipped or otherwise coated with the modified Butyl rubber cement composition just described, and it is then dried and heated in an air oven at 200 to 300° F. for about 10 to 1 minutes, e.g. at 250° F. for about 5 minutes, or for a longer time at room temperature to evaporate the volatile solvent.

The resulting treated cord, which has now been first coated with a resorcinol-formaldehyde resin, and then coated with the modified Butyl rubber composition, is now ready for use in constructing tire carcasses for autos, trucks, airplanes, etc. as well as numerous other uses such as conveyor belts and other products built up of a plurality of laminations of cord and Butyl rubber, etc., the invention being sepecially applicable to such products which at least have one layer which is Butyl rubber. The invention may also be applied in uses involving merely a single layer of a textile fabric such as cotton cloth, silk, etc., which may be either coated on one side or both sides, with the resin and modified Butyl rubber treatment described above and then bonded to a layer of Butyl rubber by calendering or any other suitable method for use in making tents, tarpaulins, raincoats, etc., as well as laminated fabrics, for instance composed of two layers of textile fabric bonded together by a single layer of Butyl rubber.

The invention is illustrated in the accompanying drawing, in which the single figure represents a cross-section of a laminated article in which a fibrous material 1 is first coated with a thin film of a water-soluble phenolic-aldehyde resin 2, dried and then given a second coating of a thin layer 3 of a reaction product of Butyl rubber with an aromatic compound having the general formula HO—Ar—NO (e.g. p-NO phenol), and then finally placed in contact with a layer of Butyl rubber 4, and the entire laminate vulcanized together.

The details and advantages of the present invention will be better understood from a consideration of the following experimental data.

The adhesions were measured by a technique essentially similar to the "H" test described by Lyons, Conrad and Nelson in Rubber Chemistry and Technology, vol. 20, page 267 et seq. (1947). (The tire cords used were rayon tire cord of 1650/2 ply construction and nylon cord of 840/2 ply construction.) A test specimen is prepared with a ½ inch length of treated cord vulcanized into the center of a 1½ x ½ x ¼ inch rubber matrix. The rubber matrix is reinforced with light cotton duck on the two long sides from which the cord does not protrude. The force required to pull the ½ inch length of cord from the rubber block is measured by means of a Scott tensile tester at a 20 inches per minute jaw separation rate.

The following list gives identifications of materials referred to by trade names.

Butyl rubber:
  GR–I 17—60 to 70 Mooney (8 min. @ 212° F.) and 9.5 to 12.5 iodine no. (Wijs)
  GR–I 25—40 to 50 Mooney (8 min. @ 212° F.) and 13 to 15.5 iodine no. (Wijs)
Fillers:
  Kosmobile 66 (MPC)—a medium processing channel black
  Philblack O (HAF)—a high abrasion furnace black
  Hi Sil C—silica
  Thermax (MT)—medium thermal black
Vulcanizing accelerators:
  Altax—benzothiazyl disulfide
  B.J.F.—3 anilinomethyl-2(3)-benzothiazolethione
  Tellurac—tellurium diethyldithiocarbamate
  Tuads—tetramethyl thiuram disulfide
Softener: Forum 40—a treated paraffinic petroleum base oil of about 110 sec. Saybolt viscosity at 100° F. Pour point, +30° F. Flash point, 365° F.
Misc.: R.T.—Room temperature The Butyl rubber matrix from which the cord lengths were dislodged was prepared in the following formulation.

| Ingredient: | Parts by weight |
|---|---|
| GR–I–17 | 100 |
| Kosmobile 66 | 50 |
| Stearic acid | 0.5 |
| Zinc oxide | 5.0 |
| Sulfur | 2.0 |
| Tellurac (tellurium diethyl dithiocarbamate) | 1.0 |
| Petroleum softener (Forum 40) | 15.0 |

Unless otherwise specified the test specimens were cured for 25 minutes at a temperature of 320° F.

The p-nitrosophenol used in following experiments was prepared by reaction of the sodium salt (Eastman's) with hydrochloric acid. The solution was cooled in ice water and the nitrosophenol separated by filtration. The product was dried in vacuum oven at 55° C. This invention is further described by the following examples.

*Example I.—Effect on adhesion of compounding ingredients in Butyl rubber*

Using a cool mill 2% by weight (4.4 g.) of p-nitrosophenol were added to 220 g. of GR-I-25. The nitrosophenol was reacted with the Butyl rubber by milling for 15 minutes at 270° F., the mill cooled, and 1 pt. (2.2 g.) of stearic acid added. Portions of this modified rubber, labeled 87A, were used to prepare the following cements.

| Cement No. | 1 | 2 | 3 | 4 | 5 | 6 | 7 |
|---|---|---|---|---|---|---|---|
| Ident. 87- | 1 | 2 | 3 | 4 | 7 | 8 | 9 |
| 87A, pts. | 103 | 103 | 103 | 103 | 103 | 103 | 103 |
| Kosmobile 66, pts. (MPC) | | 30 | 50 | 50 | 50 | | |
| Philblack O, pts. (HAF) | | | | | | 50 | |
| Hi Sil O, pts. | | | | | | | 50 |
| Thermax, pts. (MT) | | | | | 50 | | |

Fillers added cool mill—then milled for 5 minutes at 280° F. to simulate banbury mixing—the mill cooled and curatives added as indicated below

| | | | | | | | |
|---|---|---|---|---|---|---|---|
| Zinc Oxide | 5 | 5 | | 5 | 5 | 5 | 5 |
| Sulfur | 2 | 2 | | 2 | 2 | 2 | 2 |
| Tellurac | 1 | 1 | | 1 | 1 | 1 | 1 |
| B.J.F. (3-anilinomethyl-2(3)-benzothiazole-thione) | | | | | | | 1 |

Cements prepared by dissolving the following weights of each compound in 155 cc. heptane +8 cc. of isopropyl alcohol

| | | | | | | | |
|---|---|---|---|---|---|---|---|
| Grams | 11.1 | 14.1 | 15.3 | 16.1 | 21.1 | 16.1 | 16.2 |
| Percent by wt. | 9.0 | 11.1 | 12.0 | 12.5 | 15.8 | 12.5 | 12.6 |

An aqueous solution of a resorcinol-formaldehyde resin was prepared by dissolving 5 g. of resorcinol in 117 cc. of water. To this solution was added 3.68 g. of 37% formaldehyde and 10 cc. of 0.5% NaOH as catalyst. The resin was partially formed by reacting at 70–75° C. for 2 hours (labeled 86A). This solution was then cooled to room temperature. The cord was treated by rapidly pulling it through a guide which forced it beneath the surface of the resin solution contained in a beaker. The original length and twist of the cord was preserved. The cords were dried by placing in a circulating air oven for 5 minutes at 250° F. The cements were applied using the same equipment and employing an air wipe to assist removal of the excess cement from the cord immediately after it had passed through the cement. The cord was again placed in the air oven at 250° F. for 5 minutes to remove residual solvent and "H" test specimens prepared.

| Cement | 1 | 2 | 3 | 4 | 5 | 6 | 7 |
|---|---|---|---|---|---|---|---|
| Adhesion of Butyl to rayon treated with 86A: | | | | | | | |
| Pounds @ R.T. | 11.9 | 17.4 | 19.5 | ª 20.22 | 17.3 | 17.8 | 16.8 |
| Pounds @ 212° F. | 7.6 | 12.9 | 12.5 | 13.4 | 13.5 | 12.1 | 12.3 |
| Adhesion of Butyl to nylon treated with 86A: | | | | | | | |
| Pounds @ R.T. | | | | | 14.4 | | 13.7 |
| Pounds @ 212° F. | | | | | 9.6 | | 8.1 |

ª Value obscured by cord failures.

The Butyl compound may be varied as is well known in the art and good adhesion obtained to rayon and nylon treated with a resorcinol-formaldehyde resin solution. Curatives are not required, cement 3 versus 4, but appear to favorably affect the adhesion strength.

*Example II.—Effect of nitrosophenol concentration*

GR-I-25 was modified with from 0.5 to 5.0 pts. of p-nitrosophenol per 100 of rubber as described in Example I. The following data table lists the concentrations used and the adhesion to Butyl rubber obtained on rayon tire cord treated with 86A prior to cement dipping.

| Cement | 8 | 9 | 10 | 11 |
|---|---|---|---|---|
| Ident. 87- | 10 | 11 | 12 | 14 |
| GR-I-25, pts. | 100 | 100 | 100 | 100 |
| p-Nitrosophenol, pts. | 0.5 | 1.0 | 3.0 | 5.0 |

Cool mill mixed—reacted by milling for 15 minutes at 280° F.

| | | | | |
|---|---|---|---|---|
| Stearic Acid | 1 | 1 | 1 | 1 |
| Kosmobile 66 | 50 | 50 | 50 | 50 |

Cool Mill mixed—milled at 280° F. for 5 minutes

| | | | | |
|---|---|---|---|---|
| Zinc Oxide | 5 | 5 | 5 | 5 |
| Sulfur | 2 | 2 | 2 | 2 |
| Tellurac | 1 | 1 | 1 | 1 |

Cements prepared by dissolving the indicated grams of compound in 155 cc. of heptane+8 cc. of isopropyl alcohol

| | | | | |
|---|---|---|---|---|
| grams | 15.9 | 16.0 | 16.2 | 16.4 |
| percent by Wt. | 12.4 | 12.5 | 12.6 | 12.8 |

Following dipping in resin solution 86A (24 hrs. old) and cement the rayon cords were dried for 5 minutes at 250° F.

| | | | | |
|---|---|---|---|---|
| "H" Adhesion Results to Butyl Rubber: | | | | |
| Pounds @ R.T. | 17.2 | 17.9 | 17.2 | 19.5 |
| Pounds @ 212° F. | 12.5 | 12.0 | 12.9 | 12.4 |

The adhesion obtained is not critically affected by the concentration of nitrosophenol employed.

*Example III.—Influence of aqueous resin composition*

Effective resorcinol resins can be made using low mol ratios of formaldehyde to resorcinol if prepared in an alkaline system. The following table lists adhesions obtained to Butyl rubber using cement 9 from Example II.

Resins prepared by dissolving the resorcinol in sufficient water to result in a 3% by weight resin solution, formalin and catalyst added. Solutions were held at 70° C. for 2 hours—cooled to room temperature and rayon tire cord treated and dried 5 minutes at 250° F. The resin dipped cords were then treated with cement 9 and again dried for 5 minutes at 250° F.

| Resin solution | 1 | 2 | 3 | 4 | 5 | 6 | 7 | 8 | 9 | 10 | 11 | 12 |
|---|---|---|---|---|---|---|---|---|---|---|---|---|
| Ident. | 137 G | 89 H | 89 B | 89 C | 89 D | 89 E | 89 L | 89 M | 89 F | 89 G | 89 I | 89 K |
| Mol Ratios: | | | | | | | | | | | | |
| Formaldehyde | 0.0 | 0.2 | 0.4 | 0.6 | 0.8 | 1.0 | 1.0 | 1.0 | 0.0 | 0.2 | 0.6 | 1.0 |
| Resorcinol | 1.0 | 1.0 | 1.0 | 1.0 | 1.0 | 1.0 | 1.0 | 1.0 | 1.0 | 1.0 | 1.0 | 1.0 |
| Catalyst | NaOH | NaOH | NaOH | NaOH | NaOH | NaOH | NaOH | NaOH | Oxalic Acid | Oxalic Acid | Oxalic Acid | Oxalic Acid |
| g./100 g. of Resorcinol | 1 | 1 | 1 | 1 | 1 | 1 | 0.5 | 2 | 1 | 1 | 1 | 1 |
| Adhesion of Butyl Rubber to Rayon: | | | | | | | | | | | | |
| Pounds @ R.T. | 6.5 | 16.3 | 17.1 | 18.3 | 19.6 | 19.0 | 18.2 | 16.3 | 7.6 | 8.8 | 8.9 | 10.0 |
| Pounds @ 212° F. | | 10.8 | 11.5 | 13.6 | 14.0 | 13.7 | 12.9 | 13.3 | | | | 5.6 |

Resin solutions prepared using alkaline condensation catalyst is required for good adhesion. The high temperature adhesion is greater for resin solutions containing 0.6 to 1 or higher mol ratios of formaldehyde to resorcinol.

Mol ratios greater than 1:1 can be successfully employed. This is demonstrated below. The modified Butyl cement was prepared in a manner and composition similar to cement No. 4 (2 pts. of p-nitrosophenol) except that GR-I-17 was substituted for GR-I-25.

| Resin Solution | 13 | 14 | 15 | 16 | 17 |
|---|---|---|---|---|---|
| Ident. 137 | H | B | C | D | H |
| Mol Ratios: | | | | | |
| Formaldehyde | 0.8 | 1.0 | 2.0 | 3.0 | 2.0 |
| Resorcinol | 1.0 | 1.0 | 1.0 | 1.0 | 1.0 |
| Catalyst | NaOH—1 g. per 100 g. Resorcinol | | | | |
| Resin Concentration, Wt. Percent in Water | 5.0 | 5.0 | 5.0 | 5.0 | 2.5 |

Solutions held at 70° C. for 2 hours prior to cooling for cord treating. Treated with above resin solutions and dried 5 min. at 212° F. Cement treated and dried for 5 minutes at 212° F.

| Adhesion of Butyl Rubber to Rayon Tire Cord: | | | | | |
|---|---|---|---|---|---|
| Pounds @ R.T. | 17.5 | 19.9 | 18.2 | 16.3 | 19.0 |
| Pounds @ 212° F | 13.6 | 12.5 | 13.1 | 12.8 | 10.3 |

For comparison an adhesion value of 9.1 pounds was obtained to rayon without an aqueous dip. The data show satisfactory aqueous resin solutions can be prepared using from 0.2 to 3 moles of formaldehyde per mole of resorcinol at 2.5, 3.0 or 5.0% resin solids concentration.

*Example IV.—Influence of vulcanization conditions on adhesion*

Rayon cord lengths were treated with resin solution 86A and cement 4 and dried at 250° F. as described in Example I. Test specimens were cured at the two extremes of Butyl curing conditions shown below and the "H" test value measured.

| Cure Description | Adhesion to Rayon, Pounds at R.T. |
|---|---|
| 25 min. at 300° F | 18.7 |
| 45 min. at 320° F | 18.5 |

These results are both good, and so indicate that this bonding technique is not sensitive to vulcanization conditions employed.

*Example V.—Effect of cement drying conditions*

As in Example IV cord lengths were treated with resin solution 86A and dried for 5 minutes at 250° F. They were then treated with cement No. 4 and dried as shown below.

| Cement Drying Conditions | Adhesion Butyl to Rayon At Room Temperature, pounds |
|---|---|
| Room Temperature, 16 hrs | 18.1 |
| 5 minutes @ 210° F | 17.3 |
| 5 minutes @ 250° F | 19.4 |
| 5 minutes @ 300° F | 19.0 |

Excellent adhesions using this technique are not dependent upon carefully controlled cement drying conditions.

*Example VI.—Nitrosophenol modification reaction*

The reaction of the Butyl rubber with the p-nitrosophenol need not be carried out prior to compounding as illustrated in the previous examples. The following compound was prepared on a cool mill with the nitrosophenol added last.

Ingredient:
- GR-I-17 _____pts. by weight__ 100
- Kosmobile 66 _____do____ 60
- Stearic acid _____do____ 0.5
- Zinc oxide _____do____ 5.0
- Sulfur _____do____ 2.0
- Tellurac _____do____ 1.0
- p-Nitrosophenol _____do____ 3.0

Cement formulation; grams ___ 16.4 (12.8% by wt.)
Solvent: 155 cc. heptane+8 cc. isopropyl alcohol.

Rayon tire cord treated with a resin solution similar to solution No. 15, and dried for 5 min. at 225° F., was treated with above cement and dried again for 5 min. at 225° F.

Adhesion at R.T. _____pounds__ 16.2

*Example VII.—Use of sodium salt of p-nitrosophenol*

Three hundred grams of GR-I-25 were compounded with 2 parts of sodium salt of p-nitrosophenol on a cool mill and divided into 2 equal portions. These were reacted on a hot mill and compounded as shown below.

| Reaction Conditions | 10 min. @ 240-250° F. | 10 min. @ 300-310° F. |
|---|---|---|
| Compounding Ingredients added on a cool mill, pts. by weight: | | |
| Kosmobile 66 | 50 | 50 |
| Zinc Oxide | 5.0 | 5.0 |
| Stearic Acid | 0.5 | 0.5 |
| Sulfur | 2.0 | 2.0 |
| Tellurac | 1.0 | 1.0 |

Cements prepared by dissolving 16 g. in 155 cc. heptane and 8 cc. of isopropyl alcohol
Rayon cord lengths dipped in aqueous resin solution 14, dried for 5 minutes at 250° F. and again for 5 minutes at 250° F. following cement treating

| Adhesion of Rayon to Butyl Rubber, "H" Test Results: | | |
|---|---|---|
| Pounds at R. T | 15.9 | 16.1 |
| Pounds at 212° F | 11.5 | 13.3 |

Excellent adhesions can be obtained using either the p-nitrosophenol or its sodium salt in conjunction with a resorcinol-formaldehyde resin dip on the cord.

*Example VIII*

A partially reacted resin solution was prepared by

G.
- Resorcinol _____ 15
- 37% formaldehyde _____ 11.0
- 1% NaOH _____ 15.0
- Distilled water _____ 149.7

After heating, this masterbatch solution was diluted by addition of more distilled water to prepare dips containing from 0.5 to 10% solids, based on formaldehyde and resorcinol content. Rayon cord length were treated with the solutions and dried for 5 minutes at 250° F.

| Solution | A | B | C | D | E | F |
|---|---|---|---|---|---|---|
| Percent Resin Solids | 10.0 | 7.5 | 5.0 | 2.5 | 1.0 | 0.5 |

These dried resin treated cord lengths were then treated with a cement similar to Example I—cement 4 except that 2.5 pts. p-nitrosophenol was reacted with the GR-I-25. Cement treated cords were dried for 5 minutes at 250° F. and "H" type adhesion samples prepared.

| Adhesion of Butyl Rubber to Rayon, pounds: | | | | | | |
|---|---|---|---|---|---|---|
| Room Temp | 11.9 | 14.3 | 19.4 | 20.4 | 18.8 | 18.1 |
| 212° F | 9.6 | 9.3 | 12.9 | 13.5 | 13.0 | 11.4 |

Range 1 to 5% solids appears most attractive.

Higher concentrations might be used advantageously when squeeze rolls or other mechanical devices are used to limit the amount of pickup of the resin solution.

Example IX

This example uses room temperature reaction conditions for 24 hours (rather than 70° C. for 2 hours) to prepare resin solutions. These samples contain 5% resin solids based on formaldehyde and resorcinol and, for the 3/1 mol ratio resin, 4 concentrations of sodium hydroxide. Rayon cord was used in the main series, but nylon data are also available for the 3/1 resin dips. Catalyst concentrations were from 0.5 to 4.0 pts./100 of resorcinol.

ROOM TEMPERATURE REACTED RESIN SOLUTIONS (5% RESIN SOLIDS)

| Resin Solution | 1 | 2 | 3 | 4 | 5 | 6 | 7 | 8 | 9 |
|---|---|---|---|---|---|---|---|---|---|
| Mol ratio: formaldehyde to resorcinol | 1/1 | 2/1 | 3/1 | 3/1 | 3/1 | 3/1 | 4/1 | 5/1 | 6/1 |
| Catalyst Concentration: grams of NaOH per 100 of resorcinal | 1 | 1 | 0.5 | 1.0 | 2.0 | 4.0 | 1 | 1 | 1 |

Resin solutions allowed to age 24 hours prior to treating tire cord. After passing through solution, cords were dried for 5 min. at 250° F., then treated cement used in previous example GR-I-25 reacted with 2.5 pts. p-nitrosophenol. Final drying was for 5 min. at 250° F.

| | 1 | 2 | 3 | 4 | 5 | 6 | 7 | 8 | 9 |
|---|---|---|---|---|---|---|---|---|---|
| Adhesion to Rayon: | | | | | | | | | |
| Room Temp | 16.1 | 18.4 | 18.4 | 20.2 | 19.6 | a 17.7 | 19.4 | a 17.9 | a 200 |
| 212° F | 13.4 | 14.0 | 16.3 | 14.0 | a 17.0 | a 17.0 | 15.0 | 14.3 | |
| Adhesion to Nylon: | | | | | | | | | |
| Room Temp | | | | 9.5 | 11.2 | 12.9 | 16.5 | | |
| 212° F | | | | 10.0 | 9.0 | | | | | a Number of cord failures encountered in testing these samples.

Example X

This example demonstrates the application of the modified Butyl to the resin surface on the cord by calendering and use of small Banbury (No. 00–5 lb. capacity) for reaction and mixing of MPC carbon black with the modified GR-I-25.

In the No. 00 Banbury 2,000 g. of GR-I-25 and 22.5 g. of stearic acid were charged. After 2 minutes of mixing 250 g. of GR-I-25 into which was milled 135 g. of 33% p-nitrosophenol on clay was added. The reaction was conducted by mixing for 8 minutes without cooling water. The temperature of the mix at dump was 335° F. as measured with a needle pyrometer.

In 1872 g. of this modified GR-I-25 in the No. 00 Banbury 875 g. of MPC black was added using a total Banbury time of 10¾ minutes. The temperature at dump as taken above with needle pyrometer was 395° F.

A compound for calendering was prepared by adding softener and curatives on a cool mill.

| | Pts. by weight |
|---|---|
| Black compound | 157 |
| Coray 230 a | 5 |
| Zinc oxide | 5 |
| Sulfur | 2 |
| Tellurac | 1 | a Acid treated aromatic petroleum softener—Saybolt vis. 100° F.—10,533 sec.; at 210° F.—235 sec.; flash point—525° F.; pour point—15° F.

Rayon tire cord treated with aqueous resin solution similar to resin solution #8 in previous example IX and dried for 5 minutes at 250° F., were covered with the above compound using 3 roll laboratory calendar. "H" type adhesion samples were prepared and an average adhesion value of 16.1 pounds obtained between this calendered cord and Butyl rubber.

Example XI

Wetting agents may be included in the aqueous dip and in the case of nylon raising the pH of the dip prior to cord treatment is frequently advantageous. This is demonstrated below:

| Aqueous Dip | 1 | 2 | 3 |
|---|---|---|---|
| Mol Ratio: | | | |
| Formaldehyde to Resorcinol | 5/1 | 5/1 | 5/1 |
| Resin Solids, Percent | 5 | 5 | 5 |
| NaOHa, g./100 resorcinol | 1 | 1 | 1 |

Aged 24 hours—Following agents added prior to treating nylon tire cord

| | | | |
|---|---|---|---|
| NaOHa, g./100 g. resorcinol | | 3 | |
| Aerosol OT, cc. of 5% solution per g. of resorcinol | 5 | 3 | |

Cords dried 5 minutes at 250° F. Cement used: Example VIII (2.5 pts. nitrosophenol in GR-I-25) and cords again dried for 5 minutes at 250° F.

| Adhesion to Nylon at Room Temperature: Pounds | 13.3 | 13.3 | 8.4 |
|---|---|---|---| a Added as 1% solution.

We claim:

1. The process comprising treating a fibrous material with an aqueous solution of a phenolic-aldehyde resin, drying it and then treating it with about 0.1 to 5 wt. percent of a Butyl rubber reaction product of a nitroso hydroxy aromatic compound having the general formula HO—Ar—NO in which Ar is an aromatic hydrocarbon nucleus.

2. The process according to claim 1 followed by bonding the treated fibrous material directly with a layer of unmodified Butyl rubber.

3. The process comprising coating fibers with an aqueous solution of a resorcinol-formaldehyde resin, drying it, and then coating it with a volatile solvent solution of a reaction product of Butyl rubber with about 0.1 to 5 wt. percent of a nitroso hydroxy aromatic compound having the general formula HO—Ar—NO in which Ar is an aromatic hydrocarbon nucleus.

4. Process according to claim 3 in which the Butyl rubber reaction product has been compounded with 10 to 75 parts by weight of powdered filler per 100 parts of Butyl rubber prior to solution in the solvent.

5. Process according to claim 3 followed by bonding the coated fibrous material directly with a layer of unmodified Butyl rubber having vulcanizing agents compounded therewith, and vulcanizing the final bonded article.

6. The process comprising coating auto tire cord with an aqueous solution of a resorcinol-formaldehyde resin, formed by condensing 0.2 to 3 moles of formaldehyde per mole of resorcinol, in the presence of about 0.5 to 2.0 parts by weight of NaOH catalyst per 100 parts by weight of resorcinol, said aqueous solution containing about 2 to 5 wt. percent of resin solids, then drying the resin-coated cord, then coating it with a modified Butyl rubber cement made by first reacting an isobutylene-isoprene Butyl rubber having a Staudinger mol. wt. of about 30,000 to 50,000 and an iodine number of about 1 to 10, with about 0.5 to 3 wt. percent of p-nitrosophenol at a temperature of about 200–350° F., inversely for about 20 minutes to 1 minute, cooling to about 75–125° F., then compounding it with about 30 to 50 parts by weight, per 100 parts, of nitrosophenol-modified Butyl rubber, of a powdered filler selected from the group consisting of carbon black, silicas, aluminas, and clays, hot milling the rubber-filler mixture at about 225 to 350° F. for about 15 to 3 minutes, cooling to about 75–125° F. and adding other compounding agents including vulcanizing agents, and finally dissolving the resulting compounded modified Butyl rubber in a concentration of about 8 to 20% by weight in a volatile paraffinic hydrocarbon solvent having about 6 to 8 carbon atoms, said cement also containing about 1 to 10% by volume of a volatile organic viscosity-reducer, then after coating the tire cord with the cement, drying it to evaporate the volatile solvent.

7. Process according to claim 6 followed by bonding the coated tire cord directly with a layer of unmodified Butyl rubber containing filler and vulcanizing agents admixed therewith, shaping into the desired final form and vulcanizing the assembly.

8. A process according to claim 6 in which at least a part of powdered filler is compounded with the isobutylene-isoprene Butyl rubber prior to reacting said rubber with the para-nitroso phenol.

9. A fiber coated first with a water-soluble phenolic-aldehyde resin, and then having an outer coating of a Butyl rubber reaction product with about 0.1 to 5 wt. percent of a nitroso hydroxy aromatic compound having the general formula HO—Ar—NO in which Ar is an aromatic hydrocarbon nucleus.

10. Article comprising a fibrous material according to claim 9, having bonded directly thereto a layer of unmodified Butyl rubber.

11. A fiber coated with a first layer of a water-soluble resorcinol-formaldehyde resin, and having an outer coating film of a reaction product of Butyl rubber with about 0.1 to 5.0 wt. percent of a nitrosophenolic compound having the general formula HO—Ar—NO in which Ar is an aromatic hydrocarbon nucleus.

12. A fiber according to claim 11 in which the nitroso phenolic compound is para-nitroso phenol.

13. An auto tire cord coated first with a thin film of resorcinol-formaldehyde resin condensation product of 0.2 to 3 moles of formaldehyde per mole of resorcinol, and also having an outer coating film immediately adjacent thereto composed of a modified Butyl rubber being a reaction product of an isobutylene-isoprene copolymer having a Staudinger mol. wt. of about 30,000 to 50,000 and an iodine number of about 8 to 10, with about 0.5 to 3.0 wt. percent of p-nitrosophenol, said modified Butyl rubber having been compounded at elevated temperature with about 30 to 50 parts by weight, based on 100 parts by weight of modified Butyl rubber of a powdered filler selected from the group consisting of carbon blacks, silicas, aluminas and clays, outer film also containing vulcanizing agents.

14. A coated auto tire cord according to claim 13 having bonded directly thereto a layer of unmodified Butyl rubber having powdered filler and vulcanizing agents homogeneously admixed therewith, and said article being vulcanized.

15. The process comprising treating fibrous material with an aqueous solution of a phenolic aldehyde resin, drying it and then treating it with Butyl rubber modified with about 0.1 to 5 wt. percent of a para-nitroso phenol.

16. A process for improving the adhesion of fibrous material to rubber which comprises treating the fibrous material with a phenolic aldehyde resin, drying it, treating it with a liquid containing Butyl rubber, modified with about 0.1 to 5 wt. percent of a para-nitroso phenol, placing the treated fibrous material in another rubber and vulcanizing the rubbers.

References Cited in the file of this patent

UNITED STATES PATENTS

| | | |
|---|---|---|
| 2,035,698 | Fisher | Mar. 31, 1936 |
| 2,128,635 | Charch et al. | Aug. 30, 1938 |
| 2,354,426 | Briant | July 25, 1944 |
| 2,477,015 | Sturgis et al. | July 26, 1949 |
| 2,540,596 | Rehner | Feb. 6, 1951 |
| 2,616,876 | Rehner | Nov. 4, 1952 |
| 2,653,886 | Gentle | Sept. 29, 1953 |
| 2,707,157 | Stanton et al. | Apr. 26, 1955 |

FOREIGN PATENTS

| | | |
|---|---|---|
| 680,337 | Great Britain | Oct. 1, 1952 |